United States Patent
Fujimori et al.

(10) Patent No.: US 10,412,335 B2
(45) Date of Patent: Sep. 10, 2019

(54) DISPLAY APPARATUS AND METHOD FOR CONTROLLING DISPLAY APPARATUS

(71) Applicant: SEIKO EPSON CORPORATION, Tokyo (JP)

(72) Inventors: Toshiki Fujimori, Chino (JP); Yoshiteru Uchiyama, Suwa (JP); Takahiro Ano, Matsumoto (JP); Toru Karasawa, Minowa-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/921,101

(22) Filed: Mar. 14, 2018

(65) Prior Publication Data

US 2018/0278880 A1    Sep. 27, 2018

(30) Foreign Application Priority Data

Mar. 23, 2017   (JP) .................................. 2017-057607

(51) Int. Cl.
*H04N 5/445* (2011.01)
*H04N 5/44* (2011.01)
(Continued)

(52) U.S. Cl.
CPC ........... *H04N 5/44513* (2013.01); *G02B 6/10* (2013.01); *G02B 27/01* (2013.01); *H04N 5/4403* (2013.01); *H04N 2005/44517* (2013.01)

(58) Field of Classification Search
CPC ............. H04N 5/44513; H04N 5/4403; H04N 2005/4408
(Continued)

(56) References Cited

U.S. PATENT DOCUMENTS 6,253,000 B1 *   6/2001   Madsen ............. H04Q 11/0001
                                                              385/16
7,903,903 B1 *   3/2011   Acker ..................... H04N 5/222
                                                              348/578
(Continued)

FOREIGN PATENT DOCUMENTS

JP         H10-20985 A      1/1998
JP         2005-156747 A    6/2005
(Continued)

*Primary Examiner* — Jefferey F Harold
*Assistant Examiner* — Mustafizur Rahman
(74) *Attorney, Agent, or Firm* — Oliff PLC

(57) ABSTRACT

A display apparatus includes a display section that displays an image and a controller that controls the display apparatus based on setting information to cause the display section to display the image and changes the setting information from first setting information to second setting information in accordance with a first instruction. In a state in which the controller has changed the setting information from the first setting information to the second setting information and causes the display section to display a first image based on first image information from the first input section, and when the controller receives a second instruction to cause the display section to display a second image based on second image information from the second input section, the controller changes the setting information from the second setting information to the first setting information and causes the display section to display the second image.

8 Claims, 7 Drawing Sheets

(51) Int. Cl.
   *G02B 27/01* (2006.01)
   *G02B 6/10* (2006.01)
(58) Field of Classification Search
   USPC ....... 348/564, 563, 554, 556, 557, 578, 581,
                   348/602, 607, 631, 706, 719, 744;
                   345/589; 455/566; 601/1
   See application file for complete search history.

(56) References Cited

U.S. PATENT DOCUMENTS

| | | | |
|---|---|---|---|
| 8,456,571 B1 * | 6/2013 | Taylor | H04N 7/0122 348/445 |
| 8,479,102 B2 | 7/2013 | Son et al. | |
| 9,092,108 B2 | 7/2015 | Son et al. | |
| 2004/0027486 A1 * | 2/2004 | Fujiwara | H04N 9/3105 348/557 |
| 2006/0030795 A1 * | 2/2006 | Luberski | A63B 22/18 601/1 |
| 2007/0271522 A1 | 11/2007 | Son et al. | |
| 2009/0117943 A1 * | 5/2009 | Lee | H04H 20/426 455/566 |
| 2009/0153751 A1 * | 6/2009 | Asakura | G06F 3/1454 348/744 |
| 2010/0020989 A1 * | 1/2010 | Waldmann | H04R 25/43 381/150 |
| 2010/0073578 A1 * | 3/2010 | Tan | G06F 3/037 348/744 |
| 2010/0201812 A1 * | 8/2010 | McGibney | G06F 3/0416 348/143 |
| 2010/0208216 A1 * | 8/2010 | Hirabayashi | G03B 21/14 353/85 |
| 2011/0122147 A1 * | 5/2011 | Yasukawa | G09G 5/003 345/589 |
| 2011/0281619 A1 * | 11/2011 | Cho | G06F 3/04817 455/566 |
| 2011/0285829 A1 * | 11/2011 | Mori | G02B 27/2264 348/53 |
| 2011/0310300 A1 * | 12/2011 | Wakisaka | H04N 21/485 348/563 |
| 2012/0019726 A1 * | 1/2012 | Arora | H04N 21/42202 348/602 |
| 2013/0159872 A1 | 6/2013 | Son et al. | |
| 2013/0235215 A1 * | 9/2013 | Okada | H04N 5/77 348/207.1 |
| 2015/0002742 A1 * | 1/2015 | Nishimura | H04N 5/44513 348/552 |
| 2015/0163397 A1 * | 6/2015 | Inoue | H04N 13/232 348/333.02 |
| 2015/0331602 A1 | 11/2015 | Son et al. | |
| 2017/0161870 A1 * | 6/2017 | Clarke | G06F 3/0488 |
| 2017/0192655 A1 * | 7/2017 | Higuchi | G06F 3/0481 |

FOREIGN PATENT DOCUMENTS

| | | |
|---|---|---|
| JP | 2009-122752 A | 6/2009 |
| JP | 4916918 B2 | 4/2012 |
| JP | 5044283 B2 | 10/2012 |
| JP | 2016-29550 A | 3/2016 |
| JP | 2016-103810 A | 6/2016 |

\* cited by examiner

| ITEM | FIRST SETTING INFORMATION (REFERENCE VALUE) | SECOND SETTING INFORMATION |
|---|---|---|
| SOUND VOLUME | AA | BB |
| COLOR MODE | CC | DD |
| TRAPEZOIDAL DISTORTION CORRECTION VALUE | EE | FF |
| IP ADDRESS | GG | — |

DISPLAY APPARATUS AND METHOD FOR CONTROLLING DISPLAY APPARATUS

CROSS-REFERENCE

The entire disclosure of Japanese Patent Application No. 2017-057607, filed Mar. 23, 2017 is expressly incorporated by reference herein.

BACKGROUND

1. Technical Field

The present invention relates to a display apparatus and a method for controlling the display apparatus.

2. Related Art

In a display apparatus, such as a projector, setting values, such as the contrast of an image, are each set in advance at a reference value expected to be liked by many users in many cases. The setting values are changed in some cases by a user in accordance with the visual/audio environment and the user's preference. JP-A-2016-29550 describes a technology for creating a statistical value relating to the change in any of the settings values in a (UI) user interface on a user basis and automatically changing the setting value in the UI in accordance with the statistical value.

To automatically change the entire setting values set in the display apparatus by using the technology described in JP-A-2016-29550, the statistical value undesirably needs to be created for each of the setting values on a user basis. To avoid the problem, it is conceivable to automatically update only part of the setting values by using the statistical value.

However, setting values that are not automatically updated, which are initially set at reference values, could be changed whenever a plurality of users use the display apparatus by turns. A user of the display apparatus therefore undesirably needs to start using the display apparatus with setting values changed by another user in accordance, for example, with the other user's preference.

SUMMARY

An advantage of some aspects of the invention is to provide a technology that can prevent a user from starting using a display apparatus with setting value change by another user.

A display apparatus according to an aspect of the invention is a display apparatus including a plurality of input sections including a first input section and a second input section, a display section that displays an image based on image information inputted from at least one of the plurality of input sections on a display surface, and a controller that controls the display apparatus based on setting information on an action of the display apparatus to cause the display section to display the image and changes the setting information from first setting information to second setting information in accordance with a first instruction to change the setting information, and in a state in which the controller has changed the setting information from the first setting information to the second setting information and causes the display section to display a first image based on first image information inputted from the first input section, and when the controller receives a second instruction to cause the display section to display a second image based on second image information inputted from the second input section, the controller changes the setting information from the second setting information to the first setting information and causes the display section to display the second image.

In the display apparatus including the plurality of input sections to which image information is inputted, a user selects an input section from the plurality of input sections, and image information inputted to the selected input section is used for display operation. Therefore, in a case where the user is switched to another, the input section selected from the plurality of input sections could be switched to another.

According to the aspect described above, the setting information is changed from the second setting information after the change to the first setting information before the change in accordance with an instruction to switch the input section to which image information used for the display operation is input from the first input section to the second input section. Therefore, a situation in which a user starts using the display apparatus with setting information changed by another user (second setting information) can be avoided.

It is desirable that the display section according to the aspect described above further includes a changing section that changes the first setting information in a case where a frequency at which the setting information is changed from the first setting information to information different from the first setting information exceeds a threshold.

In a case where the setting information is changed from the first setting information to information different from the first setting information at a high frequency, the first setting information could be inappropriate. The aspect therefore allows automatic change in the first setting information that could be inappropriate.

In the display section according to the aspect described above, it is desirable that the changing section changes the first setting information based on the different information.

According to the aspect described above, since the first setting information is changed based on the information after the change, the first setting information is likely to be changed to appropriate information.

In the display section according to the aspect described above, it is desirable that the controller causes the display section to display a first setting screen for setting the first setting information and a second setting screen for setting the second setting information.

The aspect described above, in which the screen for setting the first setting information differs from the screen for setting the second setting information, can prevent the first setting information from being set by mistake in place of the second setting information and vice versa.

In the display section according to the aspect described above, it is desirable that the first setting screen is a screen that contains a partial image for setting the first setting information on a first setting item and a partial image for setting the first setting information on a second setting item, and that the second setting screen is a screen that contains a partial image for setting the second setting information on the first setting item but contains no partial image for setting the second setting information on the second setting item.

According to the aspect described above, a setting item can be so provided that the setting item allows the first setting information to be set but does not allow the second setting information to be set. A setting item can therefore be so provided that the first setting information is not changed to the second setting information.

In the display section according to the aspect described above, it is desirable that the display section displays a third image on the display surface when operation of changing the first setting information is performed on the second setting screen.

According to the aspect described above, the third screen is displayed when out-of-the-ordinary operation of changing the first setting information on the second setting screen, whereby the user can be given an alarm.

In the display section according to the aspect described above, it is desirable that when the controller receives the second instruction in the state, the controller changes the setting information from the second setting information to the first setting information and causes the display section to display the second image in a case where an action mode of the display apparatus is a first mode and maintains the setting information to be the second setting information and causes the display section to display the second image in a case where the action mode is a second mode.

According to the aspect described above, whether the setting information is changed from the second setting information to the first setting information or whether the setting information is maintained to be the second setting information can be switched from one to the other in accordance with the action mode.

A method for controlling a display apparatus according to another aspect of the invention is a method for controlling a display apparatus including a plurality of input sections including a first input section and a second input section, the method including displaying an image based on image information inputted from at least one of the plurality of input sections on a display surface, controlling the display apparatus based on setting information on an action of the display apparatus to display the image on the display surface, changing the setting information from first setting information to second setting information in accordance with a first instruction to change the setting information, and in a state in which the setting information has been changed from the first setting information to the second setting information and a first image based on first image information inputted from the first input section is displayed on the display surface, and when a second instruction to display a second image based on second image information inputted from the second input section on the display surface is received, changing the setting information from the second setting information to the first setting information and displaying the second image on the display surface.

According to the aspect described above, a situation in which a user starts using the display apparatus with setting information changed by another user can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
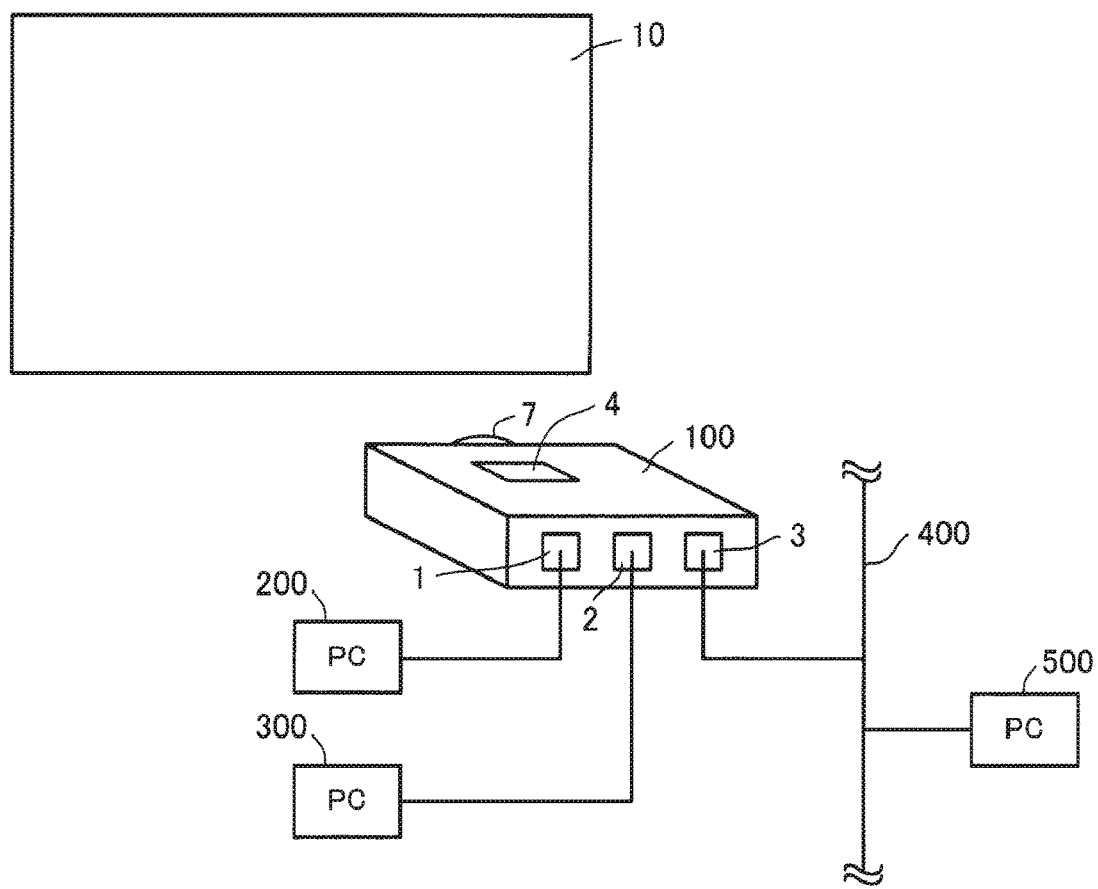
FIG. 1 shows a projector that is an example of a display apparatus according to a first embodiment.

Embodiments according to the invention will be described below with reference to the drawings. In the drawings, the dimension and scale of each portion differ from actual values as appropriate. Further, the embodiments described below are preferable specific examples of the invention. A variety of technically preferable restrictions are therefore imposed on the embodiments. The scope of the invention is, however, not limited to the restricted forms unless otherwise particularly stated in the following description that a restriction is imposed on the invention.

First Embodiment

FIG. 1 shows a projector 100, which is an example of a display apparatus according to a first embodiment. The projector 100 includes an input terminal 1, an input terminal 2, and a communicator 3. The input terminal 1 is an example of a first input section. The input terminal 2 is an example of a second input section. The communicator 3 is an example of another example of the second input section. The input terminal 1, the input terminal 2, and the communicator 3 are an example of a plurality of input sections. The number of plurality of input sections is not limited to "3" and only needs to be greater than or equal to "2".

Image information A is inputted from a PC (personal computer) 200 to the input terminal 1. The image information A is an example of first image information. Image information B is inputted from a PC 300 to the input terminal 2. The image information B is an example of second image information. Image information C is inputted from a PC 500 to the communicator 3 via a communication line 400, such as a LAN (local area network). The image information C is another example of the second image information. The source from which the image information is supplied is not limited to a PC and can be changed as appropriate. The image information may be accompanied by sound information. It is assumed in the following description that the pieces of image information A to C are each accompanied by sound information.

The projector 100 switches image information to be displayed (hereinafter referred to as "display target image information") among the pieces of image information A to C in accordance with a switch instruction (instruction to switch source from which image information is inputted to change image projected by projector 100) accepted by an accepting section 4 from a user.

For example, in a situation in which the image information A inputted via the input terminal 1 is the display target image information, the projector 100, when it receives the switch instruction to switch the source from which the image information is inputted to the input terminal 2, switches the display target image information from the image information A to image information B. The projector 100 then projects and displays an image based on the display target image information (image information B) via a projection section 7 onto a projection surface 10. The projection surface 10 is an example of a display surface.

The projector 100 operates based on setting information on an action of the projector 100 (setting information on brightness of image, for example). The projector 100 changes the setting information in accordance with a change instruction accepted by the accepting section 4 from a user. The change instruction is an example of a first instruction to change the setting information.

The projector 100, when it changes the setting information in accordance with the change instruction and the accepting section 4 then accepts the switching instruction, returns the setting information to the setting information before the change and switches the display target image information.

For example, in a state in which the projector 100 has changed the setting information in accordance with the change instruction from first setting information to second setting information and projects and displays an image based on the image information A on the projection surface 10, and when the accepting section 4 accepts the switching instruction to cause the projection section 7 to project an image based on the image information B, the projector 100 changes the setting information from the second setting information to the first setting information and causes the projection section 7 to project the image based on the image information B.

The image based on the image information A is an example of a first image. The image based on the image information B is an example of a second image. The switching instruction to cause the projection section 7 to project the image based on the setting information B (second image) is an example of a second instruction.

Figure 2:
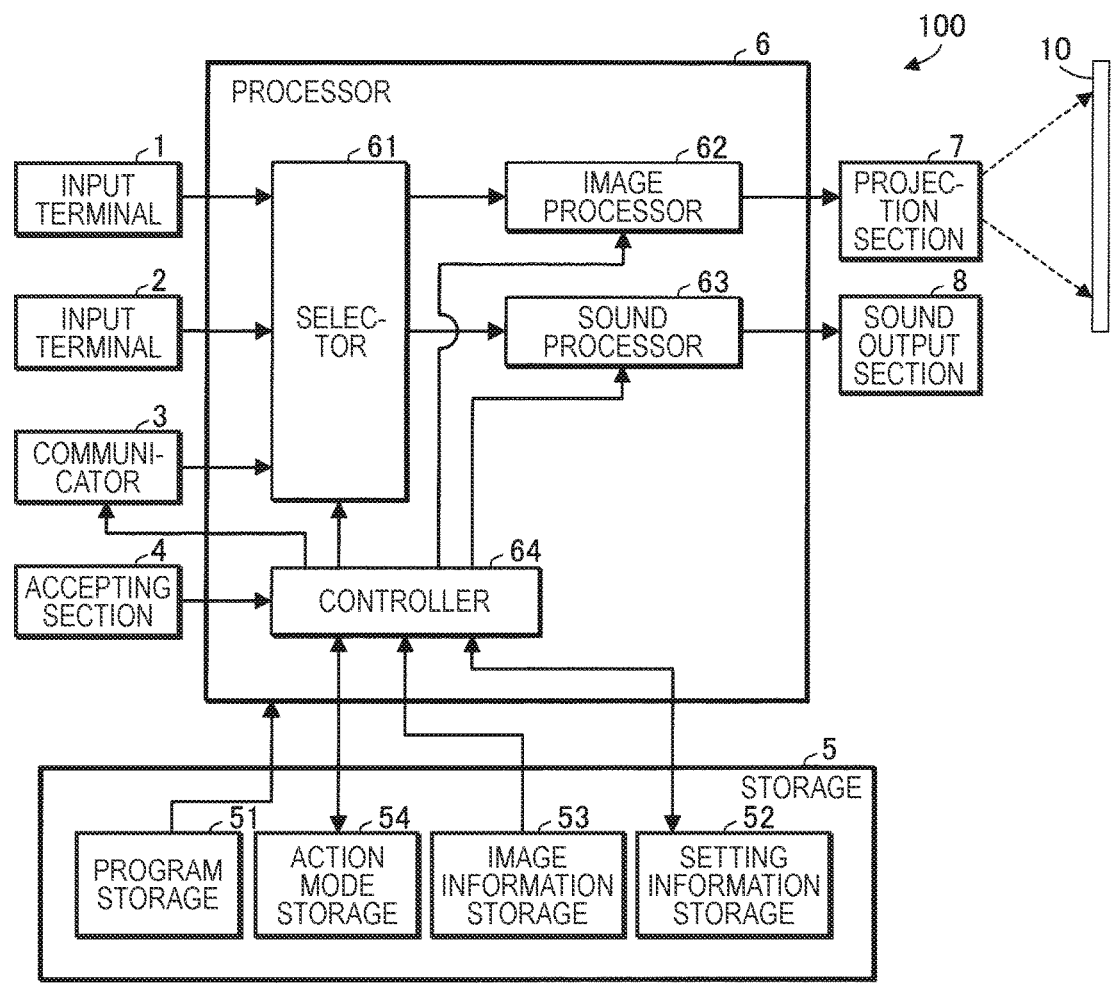
FIG. 2 shows an example of the projector.

FIG. 2 shows an example of the projector 100. The projector 100 includes, in addition to the input terminals 1 and 2 and the communicator 3 described above, the accepting section 4, a storage 5, a processor 6, the projection section 7, and a sound output section 8.

The accepting section 4 is formed of a variety of operation buttons or operation keys or a touch panel that accepts a user's input (switch instruction or change instruction, for example). The accepting section 4 may instead be a remote control or any other device that transmits an input accepted from the user wirelessly or via a wire. In this case, the projector 100 includes a receiver that receives information transmitted by the remote control. The remote control includes a variety of operation buttons or operation keys or a touch panel that accepts the user's input.

The storage 5 is a computer readable recording medium. The storage 5 includes a program storage 51, a setting information storage 52, an image information storage 53, and an action mode storage 54.

The program storage 51 stores a program that defines the actions of the projector 100.

Figures 3, 4:
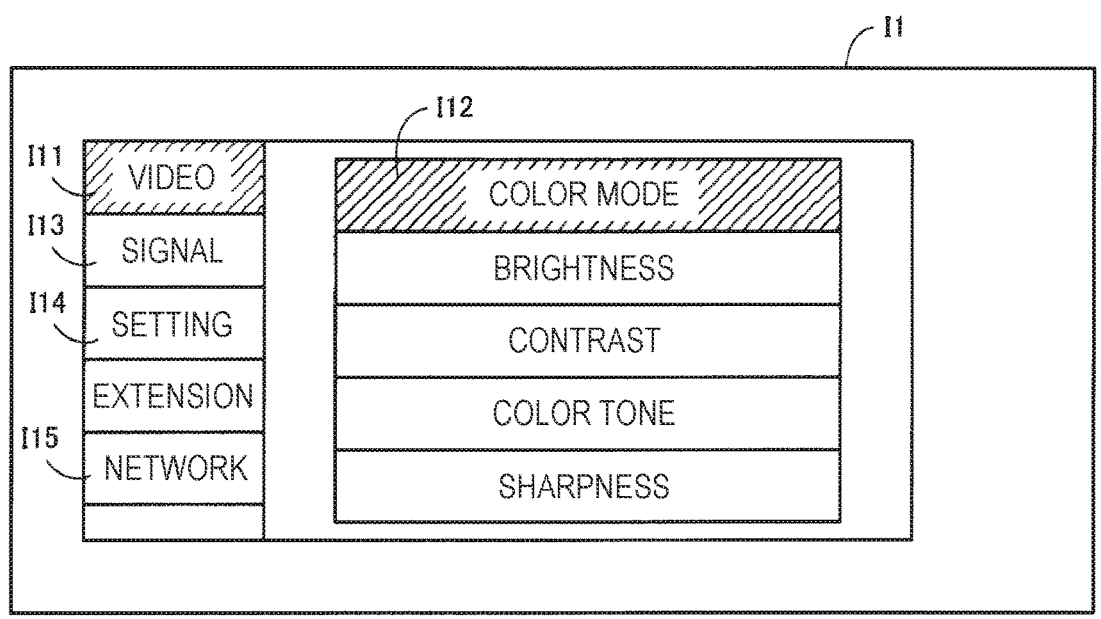
FIG. 3 shows examples of setting information stored in a setting information storage.
FIG. 4 shows an example of a first setting screen.

The setting information storage 52 stores a variety of pieces of setting information on the actions of the projector 100. FIG. 3 shows examples of the pieces of setting information stored in the setting information storage 52. The setting information storage 52 stores sound volume, a color mode, trapezoidal distortion correction value, and an IP address as setting information items (setting items). The setting information items (setting items) are not limited to the sound volume, color mode, trapezoidal distortion correction value, and IP address and can be changed as appropriate.

The setting information storage 52 stores first setting information, which functions as a reference value, for each of the sound volume, color mode, trapezoidal distortion correction value, and IP address. The first setting information is set, for example, by an administrator of the projector 100 (hereinafter simply referred to as "administrator"). The first setting information is so set as to be information (value) expected to be liked by many users. The sound volume, color mode, trapezoidal distortion correction value, and IP address are an example of a plurality of setting items. The first setting information is set for every item.

The setting information storage 52 stores second setting information for each of the following items: the sound volume; the color mode; and the trapezoidal distortion correction value. The second setting information is set, for example, by a user of the projector 100 (hereinafter simply referred to as "user"). The sound volume, the color mode, and the trapezoidal distortion correction value are an example of part of the plurality of setting items. An item for which the second setting information is set can be changed as appropriate and may, for example, be at least one of the sound volume, the color mode, and the trapezoidal distortion correction value.

The image information storage 53 stores a variety of pieces of image information (for example, first setting screen information representing first setting screen for setting first setting information and second setting screen information representing second setting screen for setting second setting information).

FIG. 4 shows an example of a first setting screen I1. The first setting screen I1 functions as a GUI (graphical user interface) for the administrator. The administrator operates the first setting screen I1 by using the accepting section 4 to set the first setting information.

For example, the administrator operates a video button I11 by using the accepting section 4 to set the first setting information on the color mode I12 (labeled with "CC" in FIG. 3). The administrator operates a signal button I13 by using the accepting section 4 to set the first setting information on the trapezoidal distortion correction value (labeled with "EE" in FIG. 3). The administrator operates a setting button I14 by using the accepting section 4 to set the first setting information on the sound volume (labeled with "AA" in FIG. 3). The administrator operates a network button I15 by using the accepting section 4 to set the first setting information on the IP address (labeled with "GG" in FIG. 3). The color mode, the trapezoidal distortion correction value, and the sound volume are each an example of a first setting item, and the video button I11, the signal button I13, and the setting button I14 are each an example of a partial image for setting the first setting information on the first setting item. The IP address is an example of a second setting item, and the network button I15 is an example of a partial image for setting the first setting information on the second setting item.

Figure 5:
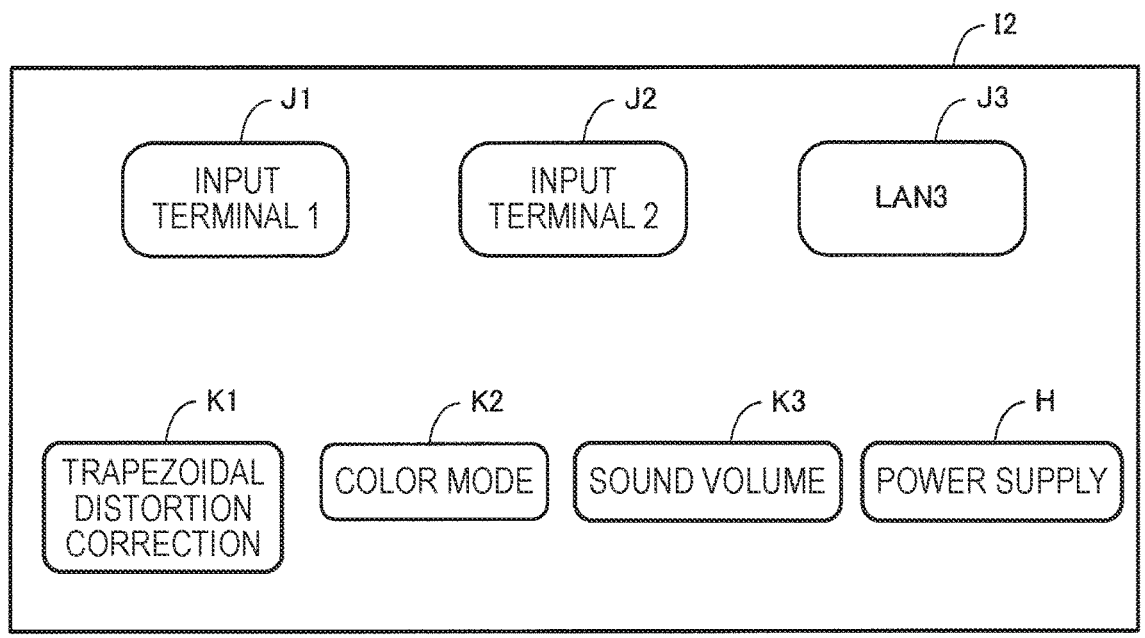
FIG. 5 shows an example of a second setting screen.

FIG. 5 shows an example of the second setting screen I2. The second setting screen I2 functions as a GUI for users. A user operates the second setting screen I2 by using the accepting section 4 to set the second setting information.

For example, the user operates a trapezoidal distortion correction button K1 by using the accepting section 4 to set the second setting information on the trapezoidal distortion correction value (labeled with "FF" in FIG. 3). The user operates a color mode button K2 by using the accepting section 4 to set the second setting information on the color mode (labeled with "DD" in FIG. 3). The user operates a sound volume button K3 by using the accepting section 4 to set the second setting information on the sound volume (labeled with "BB" in FIG. 3). The trapezoidal distortion correction button K1, the color mode button K2, and the sound volume button K3 are each an example of a partial image for setting the second information on the first setting item.

The second setting screen I2 does not allow a user to change the IP address.

The user operates a selection button J1 corresponding to the input terminal 1 by using the accepting section 4 to input the switch instruction to switch the source from which the display target image information is inputted to the input terminal 1. The user operates a selection button J2 corresponding to the input terminal 2 by using the accepting section 4 to input the switch instruction to switch the source from which the display target image information is inputted to the input terminal 2. The user operates a selection button J3 corresponding to the communicator 3 (LAN) by using the accepting section 4 to input the switch instruction to switch the source from which the display target image information is inputted to the communicator 3.

Referring back to FIG. 2, the action mode storage 54 stores an action mode of the projector 100. The projector 100 has, as the action modes, a "sharing mode" in which a plurality of users share the projector 100 and an "exclusive mode" in which a single user exclusively uses the projector 100. The processor 6 (specifically, controller 64, which will be described later) sets the action mode in accordance with an action mode setting instruction accepted by the accepting section 4. The "sharing mode" is an example of a first mode, and the "exclusive mode" is an example of a second mode.

The processor 6 is a computer, such as a CPU (central processing unit). The processor 6 reads and executes the program stored in the program storage 51 to achieve a selector 61, an image processor 62, a sound processor 63, and a controller 64. A single CPU (or semiconductor chip) may achieve the selector 61, the image processor 62, the sound processor 63, and the controller 64, or a plurality of CPUs (or semiconductor chips) may be used to achieve the selector 61, the image processor 62, the sound processor 63, and the controller 64.

The selector 61 selects the display target image information from the image information A, which is inputted via the input terminal 1, the image information B, which is inputted via the input terminal 2, and the image information C, which is inputted via the communicator 3.

Since each of the pieces of image information A to C is accompanied by sound information, as described above, the display target image information is also accompanied by sound information. The selector 61 outputs the sound information by which the display target image information is accompanied to the sound processor 63 and outputs the display target image information from which the sound information is removed to the image processor 62.

The image processor 62 performs image processing (trapezoidal distortion correction, luminance adjustment, contrast adjustment, color tone adjustment, and sharpness adjustment, for example) on the display target image information to produce an image signal. In the present embodiment, the combination of the luminance adjustment, the contrast adjustment, the color tone adjustment, and the sharpness adjustment is called the "color mode."

The sound processor 63 adjusts the sound volume in the sound information to produce a sound signal.

The controller 64 controls the projector 100.

For example, the controller 64 stores the first setting information accepted by the accepting section 4 via the first setting screen I1 in the setting information storage 52. The controller 64 stores the second setting information accepted by the accepting section 4 via the second setting screen I2 in the setting information storage 52.

The controller 64 uses the first setting information stored in the setting information storage 52 to set setting information in each of the image processor 62, the sound processor 63, and the communicator 3.

The controller 64 changes the setting information in each of the image processor 62 and the sound processor 63 from the first setting information to the second setting information in accordance with the change instruction.

The controller 64 returns the setting information in each of the image processor 62 and the sound processor 63 to the setting information before the change (first setting information) in accordance with the switch instruction and switches an image displayed on the projection surface 10.

The projection section 7 is an example of a display section. The display section does not include the projection surface 10. The projection section 7 projects and displays an image according to the image signal outputted by the image processor 62 on the projection surface 10.

Figure 6:
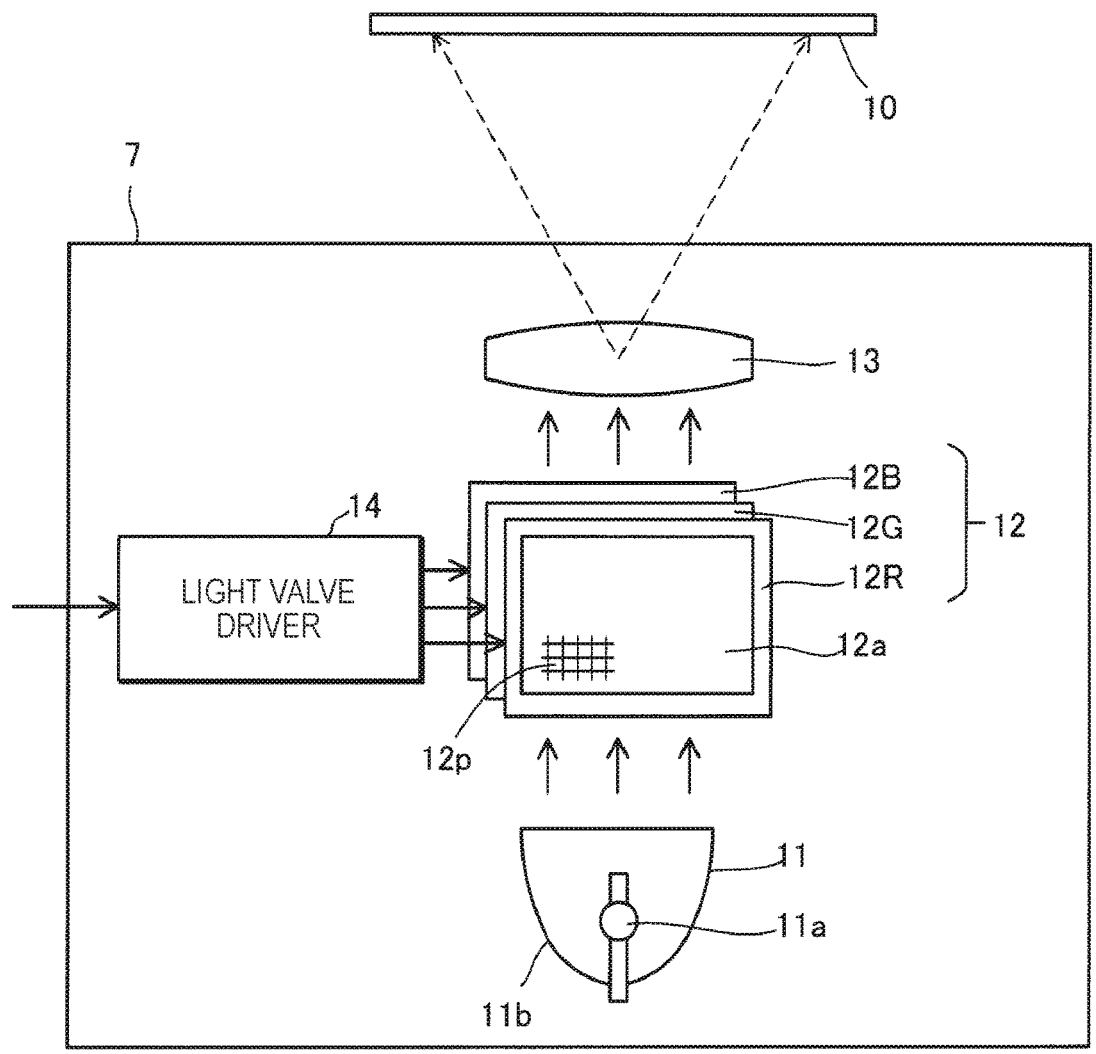
FIG. 6 shows an example of a projection section.

FIG. 6 shows an example of the projection section 7. The projection section 7 includes a light source 11, three liquid crystal light valves 12 (12R, 12G, and 12B), which are an example of a light modulator, a projection lens 13, which is an example of a projection system, a light valve driver 14, and other components. The projection section 7 causes the liquid crystal light valves 12 to modulate light outputted from the light source 11 to form a projection image (image light) and enlarges and projects the projection image via the projection lens 13.

The light source 11 includes a light source section 11a, which is formed, for example, of a xenon lamp, an ultrahigh-pressure mercury lamp, an LED (light emitting diode), or a laser light source, and a reflector 11b, which reduces variation in the direction of light emitted from the light source section 11a. The light outputted from the light source 11 passes through an optical integration system that is not shown, where variation in the luminance distribution of the light is reduced, and the resultant light is then separated by a color separation system that is not shown into color light components of red (R), green (G), and blue (B), which are the three primary colors of light. The RGB color light components are incident on the liquid crystal light valves 12R, 12G, and 12B, respectively.

The liquid crystal light valves 12 are each formed, for example, of a liquid crystal panel in which a liquid crystal material is encapsulated between a pair of transparent substrates. The liquid crystal light valves 12 each have a rectangular pixel area 12a formed of a plurality of pixels 12p arranged in a matrix. In each of the liquid crystal light valves 12, drive voltage is applicable to the liquid crystal material for each of the pixels 12p. The light valve driver 14 applies drive voltage according to the image signal inputted from the image processor 62 to each of the pixels 12p, and the pixel 12p has light transmittance set in accordance with the image signal. The light outputted from the light source 11 is therefore modulated when passing through the pixel areas 12a to form images according to the image signal on a color basis.

The color images are combined with one another by a light combining system that is not shown for each of the pixels 12p into projection image light (projection image) that is color image light (color image). The projection image light is enlarged and projected by the projection lens 13 onto the projection surface 10.

Referring back to FIG. 2, the sound output section 8 is, for example, a loudspeaker and outputs sound according to the sound signal outputted by the sound processor 63.

The action of the projector 100 will next be described.

For example, when the projector 100 starts operating in a situation in which the setting information storage 52 stores the first setting information but no second setting information, the controller 64 sets the first setting information (see FIG. 3) stored in the setting information storage 52 as the setting information in the image processor 62, the sound processor 63, and the communicator 3.

Specifically, the controller 64 sets first setting information AA on the sound volume as the setting information on the sound volume in the sound processor 63. The controller 64 further sets first setting information CC on the color mode as the setting information on the color mode in the image processor 62 and sets first setting information EE on the trapezoidal distortion correction value as the setting information on the trapezoidal distortion correction value in the image processor 62. The controller 64 further sets first setting information GG on the IP address as the setting information on the IP address in the communicator 3.

Under the situation described above, when the selection button J1 on the second setting screen I2 is operated, the controller 64 causes the selector 61 to select the image information A as the display target image information. The selector 61 subsequently outputs the sound information that accompanies the image information A to the sound processor 63 and outputs the image information A from which the sound information is removed to the image processor 62.

The sound processor 63 performs processing according to the first setting information AA on the sound volume on the sound information received from the selector 61 to produce a sound signal, and the sound output section 8 outputs sound according to the sound signal.

The image processor 62 performs image processing according to the first setting information CC on the color mode and the first setting information EE on the trapezoidal distortion correction value on the image information A to produce an image signal, and the projection section 7 projects an image according to the image signal.

Thereafter, when the user operates the accepting section 4 to input the change instruction to change the first setting information on a certain item to the second setting information via the second setting screen I2, the controller 64 stores the second setting information on the item in the setting information storage 52. In the following description, it is assumed for simplification of description that the second setting information DD on the color mode has been stored in the setting information storage 52.

In this case, the controller 64 changes the setting information on the color mode set in the image processor 62 from the first setting information CC to the second setting information DD. The image processor 62 therefore uses the first setting information EE as the setting information on the trapezoidal distortion correction value and uses the second setting information DD as the setting information on the color mode to perform image processing on the image information A to produce an image signal, and the projection section 7 projects an image according to the image signal. That is, the controller 64 changes the setting information on the color mode set in the image processor 62 from the first setting information CC to the second setting information DD to cause the projection section 7 to display an image according to the image information A on the projection surface 10. The state described above is hereinafter referred to as a "first state."

Figure 7:
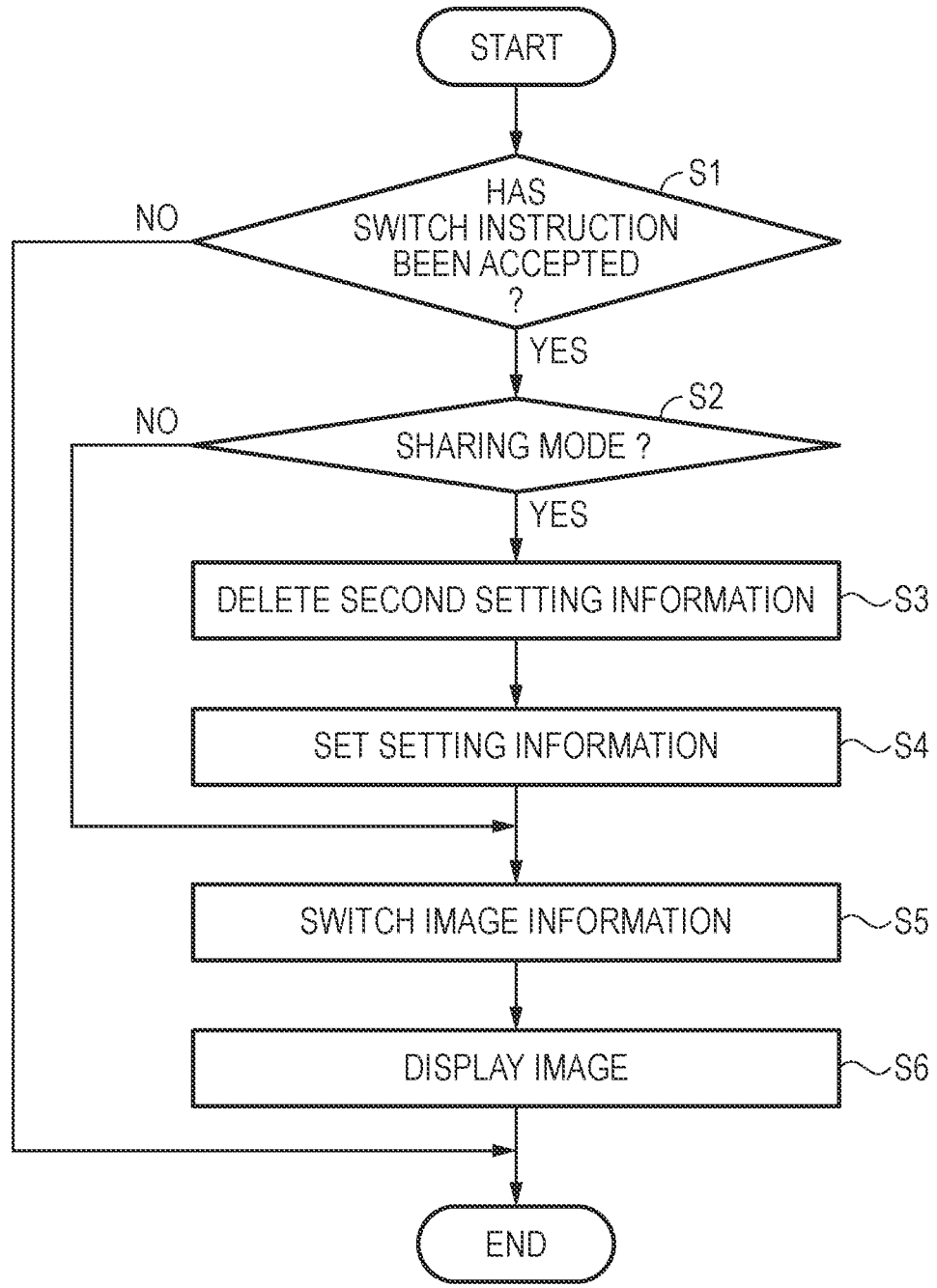
FIG. 7 describes the action of the projector in a case where an accepting section accepts a switch instruction.

The action of the projector 100 in a case where the accepting section 4 accepts the switch instruction will next be described. FIG. 7 is a flowchart for describing the action. The action shown in FIG. 7 is repeatedly carried out.

For example, it is assumed that when the projector 100 (controller 64) operates in the first state, the user is changed to another, and the new user operates the accepting section 4 to operate the selection button J2 or J3 on the second setting screen I2. In this case, the accepting section 4 accepts the switch instruction and outputs the switch instruction to the controller 64.

The controller 64, when it accepts the switch instruction (YES in step S1), refers to the action mode storage 54 and evaluates whether or not the action mode is the sharing mode (step S2).

In the case where the action mode is the sharing mode (YES in step S2), in which another user could have set the second setting information, the controller 64 deletes the second setting information in the setting information storage 52 (step S3).

The controller 64 subsequently sets the first setting information stored in the setting information storage 52 as the setting information in the communicator 3, the image processor 62, and the sound processor 63 (step S4).

Specifically, the controller 64 sets the first setting information AA on the sound volume as the setting information on the sound volume in the sound processor 63. The controller 64 further sets the first setting information CC on the color mode as the setting information on the color mode in the image processor 62 and sets the first setting information EE on the trapezoidal distortion correction value as the setting information on the trapezoidal distortion correction value in the image processor 62. The controller 64 further sets the first setting information GG on the IP address as the setting information on the IP address in the communicator 3.

The controller 64 subsequently causes the selector to select image information according to the switch instruction as the display target image information and switches the display target image information to selected image information (step S5). In a case where the selection button J2 is operated in step S1, the image information according to the switch instruction is the image information B, whereas in a case where the selection button J3 is operated in step S1, the image information according to the switch instruction is the image information C.

The selector 61 subsequently outputs the sound information by which the image information according to the switch instruction is accompanied to the sound processor 63 and outputs the image information from which the sound information is removed to the image processor 62. The sound processor 63 performs processing according to the first setting information on the sound information received from the selector 61 to produce a sound signal, and the sound output section 8 outputs sound according to the sound signal. The image processor 62 performs image processing according to the first setting information on the display target image information resulting from the switch operation in step S5 to produce an image signal, and the projection section 7 projects an image according to the image signal (step S6).

In a case where no switch instruction is accepted in step S1 (NO in step S1), the procedure shown in FIG. 7 is terminated. Further, in a case where the action mode is the exclusive mode in step S2 (NO in step S2), the procedure proceeds to the process in step S5. After the process in step S5, the selector 61 outputs the sound information by which the image information according to the switch instruction is accompanied to the sound processor 63 and outputs the image information from which the sound information is removed to the image processor 62. The sound processor 63 performs processing according to the second setting information on the sound information received from the selector 61 in the case where the second setting information has been set and performs processing according to the first setting information on the sound information in the case where the second setting information has not been set to produce a sound signal, and the sound output section 8 outputs sound according to the sound signal. The image processor 62 performs image processing according to the second setting information on the display target image information resulting from the switched operation in step S5 in the case where the second image information has been set and performs image processing according to the first setting information on the display target image information in the case where the second image information has not been set to produce an image signal, and the projection section 7 projects an image according to the image signal.

The projector 100 and the method for controlling the projector 100 according to the present embodiment can prevent a user to start using the projector 100 with setting information changed by another user.

Further, in the case where the display target image information is switched in accordance with the switch instruction, the category of the image based on the display target image information (examples of category include movie and presentation image) could change. Therefore, according to the present embodiment, in the case where the category of a displayed image could change, the setting information can be returned to the first setting information (reference value).

In the present embodiment, whether or not the setting information after a change (second setting information) is returned to the setting information before the change (first setting information) is determined in accordance with the action mode.

Therefore, in the case where the projector 100 is shared, setting the action mode to be the "sharing mode" can prevent a user from starting using the projector 100 with setting information changed by another user.

Further, in the case where the projector 100 is exclusively used by a single user, even when the switch instruction is issued, setting the action mode to be the "exclusive mode" allows the setting information after the change to be maintained. The projector 100 therefore does not force a single user to repeatedly change the same setting information in the same manner.

Variations

The invention is not limited to the embodiment described above, and a variety of variations, for example, those that will be described below, are conceivable. Further, one or more variations arbitrarily selected from the following aspects of variations can be combined with one another as appropriate.

Variation 1

The GUI for setting the first setting information is not limited to the first setting screen I1 shown in FIG. 4 and can be changed as appropriate. The GUI for setting the second setting information is not limited to the second setting screen I2 shown in FIG. 5 and can be changed as appropriate.

Variation 2

The first setting information and/or the second setting information may be set via a setting section different from a GUI. For example, the setting section different from a GUI may be a setting section that sets the first setting information and/or the second setting information in accordance with an instruction from an external apparatus over communication.

The setting section different from a GUI may instead be a changing section that automatically updates the first setting information based on the history of change in the setting information.

For example, the first setting information set as a reference value by the administrator could be setting information that is not desired by a user. In this case, the user needs to use the second setting screen I2 to change the setting information from the first setting information to the second setting information whenever the user uses the projector 100. Further, in this situation, the administrator is forced to change the first setting information (reference value) in response to a request from the user by using the first setting screen I1. The user and even the administrator thus need to change the setting information.

In contrast, using the changing section that automatically updates the first setting information based on the history of change in the setting information can ease the change task performed by the user and even the administrator.

Figure 8:
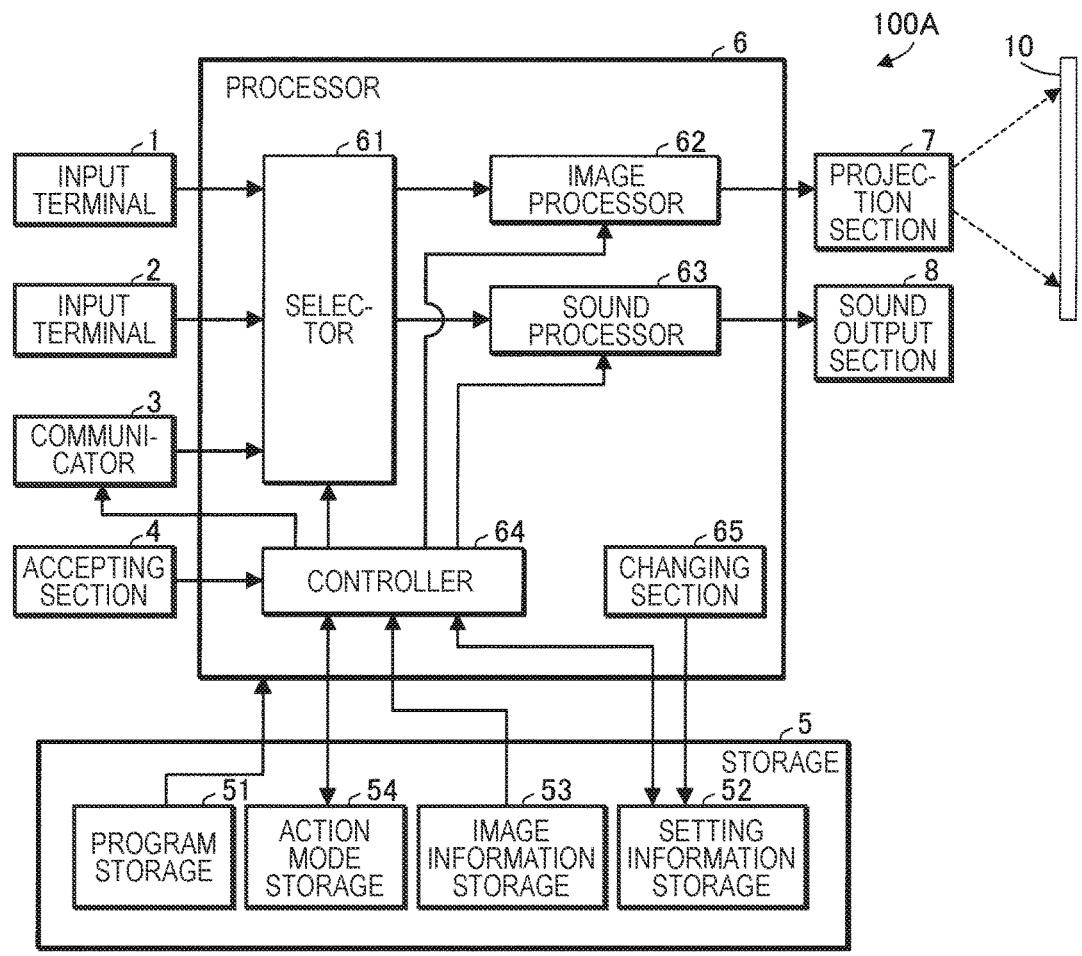
FIG. 8 shows an example of a projector including a changing section.

FIG. 8 shows an example of a projector 100A including a changing section 65, which changes the first setting information based on the history of change in the setting information. In FIG. 8, the same components as those shown in FIG. 1 have the same reference characters.

The changing section 65 is achieved by the processor 6 when it executes the program stored in the program storage 51. The changing section 65 changes the first setting information in a case where the frequency at which the setting information is changed from the first setting information to the second setting information (information different from first setting information) is greater than a threshold. For example, the changing section 65 changes the first setting information based on the second setting information.

As an example, the changing section 65 stores the history of change in the second setting information in the storage 5 on a setting information item basis (see FIG. 3). The changing section 65 further stores the history of activation of the projector 100A in the storage 5.

The changing section 65 refers to the history of change in the second setting information and the history of activation of the projector 100A and calculates the frequency at which the setting information is changed from the first setting information to the second setting information (hereinafter referred to as "change frequency") on an item basis. For example, the changing section 65 calculates, as the frequency of the change in n days (n is integer greater than or equal to 1), "the number of setting actions of the second setting information in the n days"/"the number of activations of the projector 100A in the n days."

The changing section 65 subsequently evaluates whether or not the change frequency exceeds the threshold (0.8, for example). The threshold is not limited to 0.8 and can be changed as appropriate or may be set separately on an item basis. The changing section 65 subsequently changes the first setting information on an item the change frequency associated with which exceeds the threshold, for example, to the average of the pieces of the second setting information set in the n days. The first setting information after the change is not limited to the average of the pieces of the second setting information set in the n days and can be changed as appropriate.

In the projector 100A shown in FIG. 8, since the first setting information is changed based on the information after a change (second setting information), the first setting information is likely to be changed to appropriate information.

Variation 3

To restrict a person who can set the first setting information and/or the second setting information, an approach for authorizing a person who can set the first setting information and/or the second setting information may be additionally employed. In this case, for example, the administrator having the administrator right can be restricted to a person who can operate the first setting screen I1, that is, a person who can set and change the first setting information.

Further, in a case where a user temporarily acquires the administrator right, for example, through password authorization, the controller 64 may permit the user to change the first setting information on the second setting screen I2.

In a case where a user having no administrator right changes the first setting information on the second setting screen I2 by using the accepting section 4, the controller 64 may output dialog box image information according to a dialog box representing a warning to the image processor 62 to cause the projecting section 7 to project the dialog box. The content indicated with the dialog box is not limited to a warning and can be changed as appropriate and may, for example, be a description stating that the administrator right is required. The controller 64 may cause the projecting section 7 to project a screen showing an authorization procedure for the administrator in place of the dialog box. In this case, the dialog box and the screen showing an authorization procedure for the administrator are each an example of a third image.

Variation 4

In the action shown in FIG. 7, step S2 may be omitted, and when the switch instruction is accepted in step S1 (YES in step S1), step S3 may be carried out. In this case, the action mode storage 54 can also be omitted.

Variation 5

The input terminal 1 may be replaced with a communicator, and the communicator 3 may be replaced with an input terminal.

Variation 6

The selector 61 may select two or more pieces of image information as the display target image information. In this case, the image processor 62 may produce a superimposed image signal according to a superimposed image that is a superimposition of images based on the two or more pieces of display target image information, and the projecting section may project the superimposed image according to the superimposed image signal on the projection surface 10.

Variation 7

The projecting section 7 uses liquid crystal light valves as the light modulator, and the light modulator may not be formed of liquid crystal light valves and can be changed as appropriate. For example, a configuration using three reflective liquid crystal panels may be used as the light modulator. The light modulator may still instead, for example, be based on one liquid crystal panel combined with a color wheel, three digital mirror devices (DMDs), or one digital mirror device combined with a color wheel. In the case where only one liquid crystal panel or DMD is used as the light modulator, no members corresponding to the color separation system and the light combining system are required. Further, a configuration including no liquid crystal panel or DMD but capable of modulating light emitted from a light source can be employed as the light modulator.

Variation 8

A projector is used as the display apparatus, but the display apparatus is not limited to a projector and can be changed as appropriate. For example, the display apparatus may be a direct-view display (such as liquid crystal display, organic EL (electro luminescence) display, plasma display, and CRT (cathode ray tube) display).

Variation 9

The entirety or part of the elements achieved when the processor 6 executes the program may be achieved by hardware formed, for example, of an FPGA (field programmable gate array), an ASIC (application specific IC), or any other electronic circuit or may be achieved by software and hardware that cooperate with each other.

What is claimed is:

1. A display apparatus comprising:
    a plurality of input sections including a first input section and a second input section;
    a display section that displays on a display surface an image based on image information inputted from at least one of the plurality of input sections; and
    a controller that controls the display apparatus based on setting information on an action of the display apparatus to cause the display section to display the image and changes the setting information from first setting information to second setting information in accordance with a first instruction to change the setting information,
    wherein (i) in a state in which the controller has changed the setting information from the first setting information to the second setting information while causing the display section to display a first image based on first image information inputted from the first input section, and (ii) when the controller receives, while the first image is displayed by the display section based on the second setting information, a second instruction to cause the display section to display a second image based on second image information inputted from the second input section, the controller changes the setting information from the second setting information to the first setting information and causes the display section to display the second image.

2. The display apparatus according to claim 1, further comprising a changing section that changes the first setting information in a case where a frequency at which the setting information is changed from the first setting information to information different from the first setting information exceeds a threshold.

3. The display apparatus according to claim 2, wherein the changing section changes the first setting information based on the different information.

4. The display apparatus according to claim 1, wherein the controller causes the display section to display a first setting screen for setting the first setting information and a second setting screen for setting the second setting information.

5. The display apparatus according to claim 4,
    wherein the first setting screen is a screen that contains a partial image for setting the first setting information on a first setting item and a partial image for setting the first setting information on a second setting item, and
    the second setting screen is a screen that contains a partial image for setting the second setting information on the first setting item but contains no partial image for setting the second setting information on the second setting item.

6. The display apparatus according to claim 4, wherein the display section displays a third image on the display surface when operation of changing the first setting information is performed on the second setting screen.

7. The display apparatus according to claim 1,
    wherein when the controller receives the second instruction in the state, the controller
    changes the setting information from the second setting information to the first setting information and causes the display section to display the second image in a case where an action mode of the display apparatus is a first mode, and maintains the setting information to be the second setting information and causes the display section to display the second image in a case where the action mode is a second mode.

8. A method for controlling a display apparatus including a plurality of input sections including a first input section and a second input section, the method comprising:
- displaying on a display surface an image based on image information inputted from at least one of the plurality of input sections;
- controlling the display apparatus based on setting information on an action of the display apparatus to display the image on the display surface;
- changing the setting information from first setting information to second setting information in accordance with a first instruction to change the setting information; and
- (i) in a state in which the setting information has been changed from the first setting information to the second setting information while a first image based on first image information inputted from the first input section is displayed on the display surface, and (ii) when a second instruction to display a second image based on second image information inputted from the second input section on the display surface is received while the first image is displayed based on the second setting information, changing the setting information from the second setting information to the first setting information and displaying the second image on the display surface.

* * * * *